April 22, 1924.
J. W. MOWREY
BELTING
Filed Nov. 29, 1920
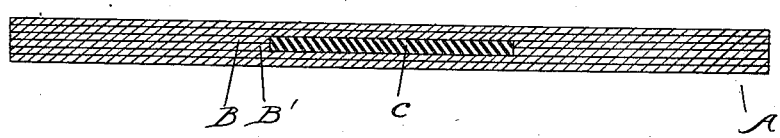
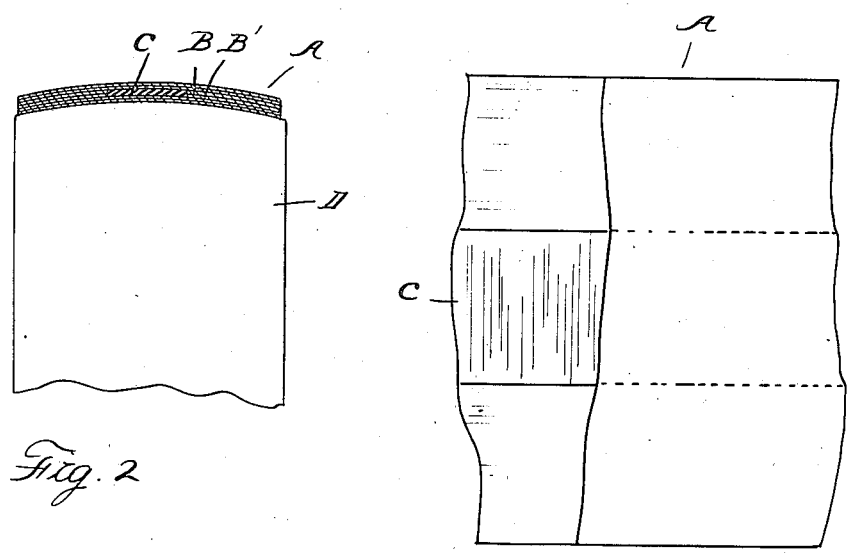

Patented Apr. 22, 1924.

1,491,412

UNITED STATES PATENT OFFICE.

JAMES W. MOWREY, OF DETROIT, MICHIGAN, ASSIGNOR TO SECURITY RUBBER AND BELTING COMPANY, OF CHICAGO, ILLINOIS, A CORPORATION OF ILLINOIS.

BELTING.

Application filed November 29, 1920. Serial No. 427,049.

*To all whom it may concern:*

Be it known that I, JAMES W. MOWREY, a citizen of the United States of America, residing at Detroit, in the county of Wayne and State of Michigan, have invented certain new and useful Improvements in Belting, of which the following is a specification, reference being had therein to the accompanying drawings.

The invention relates to the construction of belting designed for use on crown pulleys and the invention consists in the novel construction as hereinafter set forth.

In the drawings:

Figure 1 is a cross-section through the belting;

Figure 2 is a similar view showing a belt passing over a crown pulley;

Figure 3 is a sectional plan view.

In power transmission by means of flat belts it is usual to pass the same over crown pulleys, which have the effect of centering the belt and holding the same from disengagement. It has been found, however, that where wide belts are used, the full width is not in driving contact with the pulley, particularly when traveling at high rates of speed. This is for the reason; first, that the crowning of a pulley increases the circumferential length at the center over that of the edges of the pulley and necessitates the stretching of the belt to compensate therefor; second, this stretching of the belt places a greater tension upon the center portion and consequently a greater inward pressure against the pulley, which is opposed by centrifugal force, tending to throw the belt outward and by the pressure of the air which is trapped between the belt and pulley. Thus the central portion of the belt will be maintained in frictional contact with the pulley, whereas the edge portions which are operating under lesser pressure are frequently out of action. Another detrimental effect in belts which are built up of a number of plies of fabric is the tendency for the different plies to separate, due to the concentration of stresses in the central portion.

To overcome these objections I have devised a construction of belt in which the central portion is capable of greater elongation than the edge portions, so that the stresses incident to the transmission of the load are equalized in all portions of the cross section. This I preferably accomplish by the omission of one or more fabric plies from the central portion of the belt, thereby weakening the same with respect to the edge portion. The plies thus omitted are intermediate the faces of the belt so that the latter is of uniform width, and the void which would otherwise be occasioned by the omission of the ply is filled with rubber or other yielding material.

In detail, A is a belt, which as shown is formed of six-ply fabric, the several plies being vulcanized to each other, as is usual in rubber belt construction. The two central plies B and B' are slotted longitudinally as shown and therefore the respective sections of the two central plies disposed upon opposite sides of the slots extend inward from the opposite edges of the belt only about one-third of the width of the belt. The center space provided by the slots is filled by rubber, as indicated at C. These exact proportions are not essential and it may be desirable to vary the same according to the particular effect desired.

In use, when the belt is stretched above a crown pulley, such as D, the portion thereof where the plies are omitted is capable of greater elongation than the edge portions, and the resulting longitudinal and transverse stresses are substantially equalized at the center and sides of the belt. This will effectually prevent separation of the plies from each other, will increase the efficiency of the belt by bringing all portions of the cross-section in contact with the pulley, and will lessen the wear at the center, due to slippage which would otherwise occur.

What I claim as my invention is:

1. A belt comprising a plurality of integrated fabric plies arranged in superposed relation, certain of the intermediate plies being formed in sections to provide a slot extending longitudinally of said belt, and a filler of resilient material disposed within the slot formed by said sections.

2. A belt comprising a plurality of integrated fabric plies arranged in superposed relation, certain of the intermediate plies being formed in sections to provide a slot extending longitudinally of said belt, and a filler of resilient material disposed within the slot formed by said sections, the width of said sections being equal whereby said filler is positioned centrally of said belt.

In testimony whereof I affix my signature.

JAMES W. MOWREY.